United States Patent [19]

Kumar

[11] Patent Number: 5,019,824
[45] Date of Patent: May 28, 1991

[54] MULTISTAGE ESTIMATION OF RECEIVED CARRIER SIGNAL PARAMETERS UNDER VERY HIGH DYNAMIC CONDITIONS OF THE RECEIVER

[75] Inventor: Rajendra Kumar, Cerritos, Calif.

[73] Assignee: The United States of America as represented by the Administrator, National Aeronautics and Space Administration, Washington, D.C.

[21] Appl. No.: 517,114

[22] Filed: May 1, 1990

[51] Int. Cl.[5] ............................................. G01S 13/50
[52] U.S. Cl. ...................................... 342/195; 342/99; 342/192; 342/194
[58] Field of Search ................. 342/195, 99, 155, 192, 342/194

[56] References Cited

U.S. PATENT DOCUMENTS

| | | | |
|---|---|---|---|
| 4,578,678 | 3/1986 | Hurd | 342/357 |
| 4,728,959 | 3/1988 | Maloney et al. | 342/457 |
| 4,783,744 | 11/1988 | Yueh | 364/454 |
| 4,809,005 | 2/1989 | Counselman, III | 342/352 |
| 4,876,550 | 10/1989 | Kelly | 342/357 |
| 4,894,662 | 1/1990 | Counselman | 342/357 |

OTHER PUBLICATIONS

W. J. Hurd, et al., "High Dynamic GPS Receiver Using Maximum Likelihood Estimation and Frequency Tracking," IEEE Trans. AES, vol. 23, No. 4, Jul. 1987.
C. E. Hoefener, et al., "Utilizing GPS for Ultra-High Dynamic Vehicle Tracking in Space," Proc. Int. Telemetering Conf., Las Vegas, Oct. 1986.
R. Kumar, "Fast Frequency Acquisition Via Adaptive Least Squares Algorithm," Proceedings of the International Telemetering Conference, Las Vegas, pp. 91-101, Oct. 1986.
R. Kumar, "Fast Frequency Acquisition Via Adaptive Least Squares Algorithm," IEE Proceedings, vol. 136, Pt. F, No. 4, Aug. 1989.
R. Kumar, "Differential Sampling for Fast Frequency Acquisition Via Adaptive Extended Least Squares Algorithm," Proceedings of the International Telemetering Conference, San Diego, pp. 191-201, Oct. 1987.
R. Kumar, "Efficient Detection and Signal Parameter Estimation with Applications to High Dynamic GPS Receivers," JPL Publication 88-42, Jet Propulsion Laboratory, California Institute of Technology, Pasadena, Calif.
V. Vilnrotter, et al., "A Comparison of Frequency Estimation Techniques for High Dynamic Trajectories," JPL Publication 88-19, Jet Propulsion Laboratory, California Institute of Technology, Pasadena, Calif.

Primary Examiner—John B. Sotomayor
Attorney, Agent, or Firm—Thomas H. Jones; Harold W. Adams; John R. Manning

[57] ABSTRACT

A multistage estimator is provided for the parameters of a received carrier signal possibly phase-modulated by unknown data and experiencing very high Doppler, Doppler rate, etc., as may arise, for example, in the case of Global Positioning Systems (GPS) where the signal parameters are directly related to the position, velocity and jerk of the GPS ground-based receiver. In a two-stage embodiment of the more general multistage scheme, the first stage, selected to be a modified least squares algorithm referred to as differential least squares (DLS), operates as a coarse estimator resulting in higher rms estimation errors but with a relatively small probability of the frequency estimation error exceeding one-half of the sampling frequency, provides relatively coarse estimates of the frequency and its derivatives. The second stage of the estimator, an extended Kalman filter (EKF), operates on the error signal available from the first stage refining the overall estimates of the phase along with a more refined estimate of frequency as well and in the process also reduces the number of cycle slips.

5 Claims, 14 Drawing Sheets

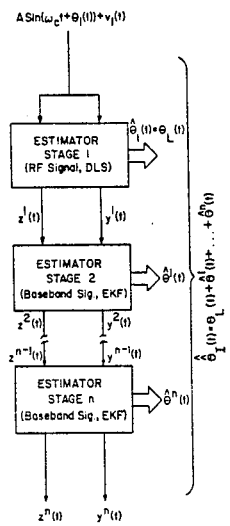

United States Patent Office

PTO - BOYERS, PA Duty Station

MISSING PAGE TEMPORARY NOTICE

PATENT # 5019824 FOR ISSUE DATE 5-28-1991

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

All Drawings

N/A at Boyers
7/8/92

Data Conversion Operation
Boyers, Pa

MULTISTAGE ESTIMATION OF RECEIVED CARRIER SIGNAL PARAMETERS UNDER VERY HIGH DYNAMIC CONDITIONS OF THE RECEIVER

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

The invention relates to a multistage scheme for estimating the parameters of a received carrier signal, such as a carrier signal phase modulated by unknown data experiencing very high Doppler, Doppler rate, etc., that arises, for example, in the case of a Global Positioning System (GPS) where the signal parameters are directed related to the position, velocity, acceleration and jerk of the GPS receiver relative to three or four satellites in the system.

2. Background Art

The problem of estimating the parameters of a received quasi-sinusoidal signal in the presence of noise occurs in diverse scientific and engineering disciplines. The signal parameters of interest are usually the phase, frequency and frequency derivatives which are varying with time. The estimation problem becomes considerably more difficult if the received carrier is modulated by unknown data while simultaneously experiencing very high Doppler and Doppler rate. As just noted, situations occur in the cases of Global Positioning System (GPS) receivers, but may also occur in NASA deep space communication links under high spacecraft dynamics.

In a paper by W. J. Hurd, J. I. Statman and V. A. Vilnrotter tilted "High Dynamic GPS Receiver Using Maximum Likelihood Estimation and Frequency Tracking," IEEE Trans., Vol. AES-23, No. 4, pp. 425-437, July 1987, an estimator scheme is proposed and analyzed for the GPS system based on the maximum likelihood estimation (MLE) of code delay and Doppler frequency over a single data bit period. This scheme estimates Doppler frequency (assumed constant over successive intervals of bit periods) and then determines frequency and frequency rate by a Kalman filter tracking Doppler. The scheme does not involve carrier phase estimation. For the dynamic trajectories simulated in the paper by W. J. Hurd, et al., the approximate MLE performance exhibited a threshold of about 30 dB-Hz in terms of the received carrier power-to-noise power spectral density ratio (CNR), below which rapid performance deterioration occurred.

For GPS applications, an alternative scheme has been proposed by C. E. Hoefener and L. Wells in a paper titled "Utilizing GPS for ultra-High Dynamic Vehicle Tracking in Space," Proceedings of the International Telemetering Conference, Las Vegas, pp. 771-773, October 1986, wherein a parallel (nondynamic) link is established between the GPS satellites and a control ground receiver for the purpose of communicating the data to the ground receiver. The ground receiver simultaneously receives the frequency translated version of the GPS receiver signal and removes the data modulation from this dynamic signal. Such an effectively demodulated signal is then processed by the estimation algorithm to obtain the desired signal parameter estimates. There are several estimation schemes in the literature for this problem. See, for example, R. Kumar, "Fast Frequency Acquisition via Adaptive Least Squares Algorithm," Proceedings of the International Telemetering Conference, Las Vegas, pp. 91-101, October 1986; R. Kumar, "Fast Frequency Acquisition via Adaptive Least Squares Algorithm," IEE Proceedings, Vol. 136, Pt. F, No, 4, pp. 155-160, August 1989; R. Kumar, "Differential Sampling for Fast Frequency Acquisition via Adaptive Extended Least Squares Algorithm," Proceedings of the International Telemetering Conference, San Diego, pp. 191-201, October 1987.

More recently in R. Kumar, "Efficient Detection and Signal Parameter Estimation with Applications to High Dynamic GPS Receiver," JPL Publication 88-42, National Aeronautics and Space Administration, Jet Propulsion Laboratory, California Institute of Technology, Pasadena, Calif., a scheme for simultaneous detection and estimation has been proposed. This scheme is based upon first estimating the received signal's local (data dependent) parameters over two consecutive bit periods, followed by the detection of a possible jump in these parameters. The presence of the detected jump signifies a data transition which is then removed from the received signal. This effectively demodulated signal is then processed to provide the estimates of the global (data independent) parameters of the signal related to the position, velocity, etc., of the receiver. From the simultaneous, it is seen that the scheme offers very significant improvement in terms of the required CNR over the approximate MLE algorithm of W. J. Hurd, et al., (1987) cited above. A key feature of this scheme, which has a computational complexity of about three times that of a single extended Kalman filter, is that to a certain extent the data detection is independent of the acquisition of the phase or frequency of the received carrier signal in contrast to the conventional decision-directed phase-locked loop receivers in which the data detector is an integral part of the loop and depends upon the acquisition of the carrier phase and/or frequency. Thus, under low CNR and/or high dynamic conditions, the loop may not acquire lock or frequently lose it during tracking.

An object of this invention is to provide an efficient method for estimating the parameters of a received carrier signal without undue computational complexity utilizing a multistage scheme.

STATEMENT OF THE INVENTION

In accordance with the present invention, the first stage of a multistage estimator operates as a coarse estimator resulting in higher rms estimation errors but with a relatively small probability of the frequency estimation error exceeding one half of the sampling frequency (an event termed cycle slip). The second stage of the multistage estimator operates on the error signal available from the first stage, refining the overall estimates, and in the process reducing the number of cycle slips.

The first stage algorithm is preferably selected to be a modified least squares algorithm referred to as differential least squares (DLS) algorithm. This estimation stage provides relatively coarse estimates of the received signal frequency and its derivatives. The second stage algorithm is preferably a third-order extended Kalman filter (EKF) which yields a more refined estimate of frequency as well as an estimate of the signal phase.

A major advantage of the proposed multistage estimator is a reduction in the threshold on received carrier power-to-noise power spectral density ration (CNR) as compared to the threshold achievable by either of the two cascaded estimator stages alone. In fact, it appears from simulations that for the case of an unmodulated carrier, the proposed scheme achieves the same threshold as for an almost exact and computationally intensive implementation of the maximum likelihood estimator (MLE). For the case of a data modulated carrier, the proposed scheme provides an improvement of about 6 dB in terms of CNR compared to an earlier approximate MLE scheme reported by W. J. Hurd, et al., (1987) cited above. The over-all complexity of the algorithm is about two times the complexity of a third-order Kalman filter or a single fourth-order extended Kalman filter.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 illustrates a block diagram of a prior-art system for signal parameters estimation by differential least squares (DLS) algorithm.

FIG. 2(a) illustrates a block diagram for signal parameters estimation by least square (LS) algorithm with model noise colored.

FIG. 2(b) illustrates a conceptual block diagram for signal parameters estimation by least square (LS) algorithm with prewhitened noise.

FIG. 2(c) illustrates a block diagram for signal parameters estimation by least square in an approximate realizable equivalent of FIG. 2(b).

FIG. 3(a) illustrates a generalized single-stage estimator used in the first stage of the present invention.

FIG. 3(b) illustrates a functional block model for a more compact representation of the generalized single-stage estimator shown in FIG. 3(a).

FIG. 3(c) illustrates a functional block model for subsequent stages of a multistage estimator.

FIG. 4 illustrates a multistage estimator for the process $\theta_r(t)$.

FIG. 5 illustrates in graphs a, b and c, a high dynamic trajectory used in simulated analysis of tracking performance of a multistage estimator shown in FIG. 4 wherein n=2.

FIG. 6 is a graph of the probability of losing frequency lock vs CNR for a DLS algorithm in the absence of data modulation.

FIG. 7 is a graph of RMS frequency estimation error vs CNR for a DLS algorithm in the absence of data modulation.

FIG. 8 is a graph of the probability of losing frequency lock vs CNR for a DLS algorithm in the presence of data modulation.

FIG. 9 is a graph of RMS frequency estimation error vs. CNR for a DLS algorithm in the presence of data modulation.

FIG. 10 is a graph of the probability of losing frequency lock vs CNR for a DLS-EKF algorithm in the absence of data modulation.

FIG. 11 is a graph of RMS frequency estimation error vs CNR for a DLS-EKF algorithm in the absence of data modulation.

FIG. 12 is a graph of modulo $2\pi$ RMS phase error vs CNR for a DLS-EKF algorithm in the absence of data modulation.

FIG. 13 is a graph of the probability of losing frequency lock vs CNR for a DLS-EKF algorithm in the presence of data modulation.

FIG. 14 is a graph of RMS frequency estimation error vs CNR for a DLS-EKF algorithm in the presence of data modulation.

FIG. 15 is a graph of RMS pseudo range estimation error vs CNR for a DLS-EKF algorithm (with and without data modulation).

DETAILED DESCRIPTION OF THE INVENTION

1. Introduction

An alternative scheme for the estimation of the signal parameters will now be described for both the case of unmodulated carrier signal and the case of a carrier signal phase modulated by unknown data. The proposed scheme is somewhat simpler than that of R. Kumar, described in the aforesaid JPL Publication 88-42, in that it is not essential to explicitly detect the data modulation for the second case. Basically, the new algorithm involves an appropriate modification of the DLS scheme of R. Kumar in the aforesaid paper titled "Differential Sampling for Fast Frequency Acquisition via Adaptive Extended Least Squares Algorithm" so as to apply the algorithm to the case of unknown data modulation.

As discussed in that paper, if a DLS technique is applied with the Nyquist sampling of the received signal, a loss in performance is expected compared to the optimum achievable performance. Consequently, oversampling and cyclic sampling was proposed to avoid such a loss. In the present invention, sampling at Nyquist rate is proposed with an alternative method for estimating parameters in order to keep the overall performance close to optimum. The new scheme proposed consists of a multistage procedure wherein the parameters of the signal are estimated in more than one stage. First, coarse parameters are estimated by an algorithm like DLS which has a low threshold on CNR but with possibly higher rms estimation errors. Then an error signal whose parameters are equal to the difference between the true parameters and the coarse estimates is processed by another algorithm to estimate these error signal parameters. Since the error signal involves much smaller dynamics, the second algorithm can have smaller bandwidth resulting in a smaller estimation error. In principle, this procedure of processing an error signal in another stage can be repeated any number of times with successive stages having progressively lower bandwidths.

The example described below of a multistage estimator is confined to two stages of recursion and applies a modified least square algorithm for the first stage and a third-order extended Kalman filter algorithm for the second stage. It was expected that the overall algorithm would have both smaller threshold and smaller estimation errors compared to either algorithm operating by itself. Indeed, this is borne out by simulations presented hereinafter. Thus, for the case of no data modulation, the threshold on SNR is about 1.5 dB lower than the third-order EKF, and the estimation errors are only marginally higher than for the third-order EKF alone. The threshold achieved is in fact the same as achieved for a nearly exact implementation of the maximum likelihood estimator (MLE). It is also noted that the threshold achieved by the present invention is about 3 dB lower than conventional cross product AFC (CPAFC) loops and phase-locked loops compared by V. A. Vilnrotter, S. Hinedi and R. Kumar, "A Comparison of Frequency Estimation Techniques for High Dynamic Trajectories," JPL 88-19, Jet Propulsion Laboratory, California Institute of Technology, Pasadena, Calif., whereas the rms error is less than one half of that obtained by CPAFC. In the simulation described hereinafter, the rms error is marginally higher than for a third-order EKF due to the nonoptimal sampling used in the DLS algorithm.

For the case of data modulation, results of the simulations are compared with those reported by Hurd, et al., (1987), where analysis and simulations are presented on the performance of Fast Fourier Transform (FFT) based MLE algorithm. In that report, the trajectories of the GPS signals have somewhat less severe dynamics compared to those considered in this presentation. In terms of threshold on CNR, the proposed scheme of this presentation exhibits a threshold of 24 db-Hz compared to about 30 db-Hz reported by Hurd, et al., thus providing an improvement of about 6 dB. In terms of the rms frequency estimation errors at a 30 db-Hz CNR, the scheme of Hurd, et al., provides a rms range rate error of about 6 m/s compared to an error of less than 2m/s achieved in this simulation. There is also a very significant improvement in terms of the rms position estimation error. At about 30 dB-Hz, an rms error of 1 meter is reported by Hurd, et al., compared to about 0.25 meter obtained by the proposed algorithm. It may also be remarked that in the previous scheme of Hurd, et al., pseudo-random codes with rate 10.23 MHz are needed for the purpose of range measurements, thus requiring a zero-crossing channel bandwidth in excess of 20 MHz. The present invention on the other hand, extracts the range information from the carrier signal itself and thus needs a bandwidth equal to only a fraction of 1 MHz.

2. Receiver Configuration

Consider the problem of estimating the high dynamic phase process $\theta_I(t)$ of the desired signal $s_I(t)$ observed in the presence of an additive narrow-band noise process $v_I(t)$ as $$r_I(t) = s_I(t) + v_I(t)$$
$$= A\sin(\omega_c t + \theta_I(t) + \pi D(t)) + v_I(t), \quad (1)$$

where $\omega_c$ is the received signal carrier frequency in the absence of any dynamics and $D(t)$ is a binary digital waveform. In the case of a GPS receiver, the dynamic phase process $\theta_I(t)$ arises from the receiver dynamics and, over a sufficiently small estimation period, $$\theta_I(t) = \theta_{Io} + \omega_{Io}t^1 + \gamma_{Io}t^2 + \delta_{Io}t^3 \quad (2)$$

for some unknown parameter vector $\psi_{Io}=[\theta_{Io}\ \omega_{Io}\ \gamma_{Io}\ \delta_{Io}]$. In a somewhat simpler version of the problem, the data modulation $D(t)$ is either absent or is assumed known and thus can be eliminated from Equation (1). Both of these cases will be treated in some detail.

In the first stage, the present invention estimates the parameters related to the frequency and its derivatives using the DLS algorithm. For this purpose, the received signal $s_I(t)$ is quadrature demodulated in a conventional input section 10 comprised of mixers 11 and 12, a $\pi/2$ phase delay element 13 which shifts the phase of a signal $s_L(t)$ from a voltage-controlled oscillator (VCO) 14 and lowpass filters 15 and 16 as shown in FIG. 1. The VCO frequency update rate of $1/T_s$ indicated by a block 17 is controlled by a signal $\beta(N)$ produced by a differential least square (DLS) algorithm indicated by a block 18 the function of which will be described below. Assuming that the input of the VCO is a signal $\theta_L(t)$ which is an appropriate quadratic function of time, t, resulting in the following VCO output signal $s_L(t)$ $$s_L(t) = 2\cos(\omega_c t + \theta_L(t))$$
$$\theta_L(t) = \theta_{Lo} + \omega_{Lo} + \gamma_{Lo}t^2 + \delta_{Lo}t^3 \quad (3)$$

for some constant vector $\psi_{Lo}=[\theta_{Lo}\ \omega_{Lo}\ \gamma_{Lo}\ \delta_{Lo}]'$, the sampled version of the in-phase and quadrature components of the demodulated signal are given by $$y(k) = A\sin(\theta(k) + \pi D(k)) + v_I(k)$$
$$z(k) = A\cos(\theta(K) + \pi D(K)) + v_q(k);\ k=1,2,\ldots,N \quad (4)$$

where $$\theta(k) = \theta_I(k) - \theta_L(k) = \theta_o + \omega_o kT_s + \gamma_o(kT_s)^2 + \delta_o(kT_s)^3$$

$$\psi_o \triangleq \psi_{Io} - \psi_{Lo} = [\theta_o\ \omega_o\ \gamma_o\ \delta_o]'$$

and $\psi_o$ is the parameter vector characterizing the error signal to be estimated, with $T_s$ denoting the sampling interval. In Equation (4), $v_I(k)$ and $v_q(k)$ represent the sampled in-phase and quadrature components of the bandpass noise process $v_I(k)$. The parameter vector $\psi_o$ is estimated by the differential least squares (DLS) algorithm of R. Kumar (1988) cited above, as described in the following section.

3. Differential Least Squares (DLS) Algorithm

Consider first the problem of estimating the unknown parameters $\omega_o$, $\gamma_o$ and $\delta_o$ from the measurement Equation (4) for the case of no data modulation, i.e., when $D(k)=0$, and expanded $\sin(\theta(t))$ in a Taylor series around $t_{k-1}=(k-1)T_s$ to obtain $$\sin(\theta(t)) = \sin(\theta(k-1) + T\dot{\theta}(k-1)\cos(\theta(k-1)) + \ldots \quad (5)$$

with a similar expansion for $\cos(\theta(t))$. For small $(t-t_{k-1})$, the series in Equation (5) may be approximated by the first two terms and from Equation (4) the following differential signal model with $\tau_k=(k-\frac{1}{2})T_s$:

$$y_d(k) \triangleq y(k) - y(k-1) = T_s(\omega_o + 2\gamma_o\tau_k + 3\delta_o\pi_k^2)z(k-1) + \xi_I(k)$$
$$z_d(k) \triangleq z(k) - z(k-1) = T_s(\omega_o + 2\gamma_o\tau_k + 3\delta_o\tau_k^2)y(k-1) + \xi_q(k) \quad (6)$$

where $$\xi_I(k) \triangleq v_I(k) - v_I(k-1) - T_s(\omega_o + 2\gamma_o\tau_k + 3\delta_o\tau_k^2)v_q(k-1)$$

$$\xi_q(k) \triangleq v_q(k) - v_q(k-1) - T_s(\omega_o + 2\gamma_o\tau_k + 3\delta_o\tau_k^2)v_I(k-1) \quad (7)$$

The measurement model of Equation (6) may be rewritten in the following standard:

$$Z_d(k) = H'(k)\beta + \xi(k);\ k=1,2,\ldots N \quad (8)$$

where $$\beta' = [\omega_o \ 2\gamma_o \ 6\delta_o]$$

$$H'(k) = \begin{bmatrix} T_s z(k-1) & T_s \tau_k z(k-1) & 0.5 T_s \tau_k^2 z(k-1) \\ -T_s y(k-1) & -T_s \tau_k y(k-1) & -0.5 T_s \tau_k^2 y(k-1) \end{bmatrix} \quad (9)$$

$$Z'_d(k) = [y_d(k) \ z_d(k)]; \ \xi'(k) = [\xi_i(k) \ \xi_q(k)]$$

The parameter vector $\beta$ in Equation (8) is now estimated by an exponential data-weighted least squares algorithm in a recursive or nonrecursive from (Kalmal filter). In its nonrecursive form, the estimate of $\beta$ obtained on the basis of N measurements and denoted by $\hat{\beta}(N)$ is given by $$\hat{\beta}(N) = \left\{ \sum_{j=1}^{N} H(j) H'(j) \lambda^{N-j} \right\}^{-1} \left\{ \sum_{j=1}^{N} H(j) Z_d(j) \lambda^{N-j} \right\} \quad (10)$$

where $\lambda$ is some appropriate weighting coefficient within $0 < \lambda < 1$. An equivalent recursive form of Equation (10) is the following algorithm:

$$\hat{\beta}(N) = \hat{\beta}(k-1) + L(k)\epsilon(k)$$

$$L(k) = P(k-1)H(k)[\lambda I + H'(k)P(k-1)H(k)]^{-1}$$

$$P(k) = \{P(k-1) - P(k-1)H(k)[\lambda I + H'(k)P(k-1)H(k)]^{-1}H'(k)P(k+1)\}/\lambda \quad (11)$$

$$\epsilon(k) = Z_d(k) - H'(k)\hat{\beta}(k-1); \ k=1, 2, \ldots, N$$

Note that the matrix to be inverted in Equation (11) is only a (2×2) matrix. In an alternative but equivalent form, one may process the scalar measurements $y_d(k)$, $z_d(k)$ sequentially instead of working with the vector measurement $Z_d(k)$. Moreover, the matrix $P(k)$ of Equation (11) with $k=N$ is the same as the matrix inverse in Equation (10), i.e., $$P^{-1}(k) = \sum_{j=1}^{k} H(j)H'(j)\lambda^{k-j} \quad (12)$$

Alternatively, the matrix $P^{-1}(k)$ may be written as $$P^{-1}(k) = \sum_{j=1}^{k} \lambda^{k-j}\{z^2(j) + y^2(j)\}B_j T_s^2; \ B_j \triangleq \begin{bmatrix} 1 & \tau_j & \tau_j^2 \\ \tau_j & \tau_j^2 & \tau_j^3 \\ \tau_j^2 & \tau_j^3 & \tau_j^4 \end{bmatrix} \quad (13)$$

and thus the matrix $P(k)H(k)$ required in the update of $\beta(k)$, and equal to $L(k)$ in Equation (11), may be approximated by $$P(k)H(k) \approx X(k)[z(k) - y(k)]$$

$$\chi'(k) = \left( \sum_{j=1}^{k} \lambda^{k-j} B_j \right)^{-1} (A^2 + \sigma_v^2)^{-1} [1 \ \tau_k \ \tau_k^2]' T_s^{-1} \quad (14)$$

where $$E[v_i^2] = E[v_q^2] = (\tfrac{1}{2})\sigma_v^2; \ E[z^2(j) + y^2(j)] = A^2 + \sigma_v^2.$$

In Equation (14) the vector $X(k)$ is data independent and thus could be precomputed for $k = 1, 2, \ldots, N$ for computational simplification of Equation (11). Similarly, in the implementation of Equation (10), the first matrix may be replaced by the data independent matrix $$\left( \sum_{j=1}^{N} \lambda^{N-j} B_j \right)(A^2 + \sigma_v^2) T_s^2.$$

3(a). Modified Least Squares Algorithm

It the noise $\xi(k)$ in the signal model of Equation (8) were white, then the estimate $\hat{\beta}(N)$ obtained from the algorithm (10) or (11) would approach 0 as $N \to \infty$, if one ignores the approximation made in arriving at Equation (8) and $\lambda$ is selected equal to 1. However, as the noise $\xi(k)$ in Equation (8) is colored, there would be considerable bias in the parameter estimates under low to medium signal-to-noise ratios. To reduce such a bias or possibly eliminate it, the following simple modification is proposed. If the instantaneous frequency $\omega(\tau_k)$ at time $\tau_k$ given by $(\omega_o + 2\gamma_o \tau_k + 3\delta_o \tau_k^2)$ appearing in Equation (7) is small compared to $1/T_s$, then the noise vector $\xi(k)$ is equal to $v(k) - v(k-1)$ where $v(k) \triangleq [v_i(k) \ v_q(k)]'$. This situation is illustrated in FIG. 2(a).

To eliminate the bias, the noise $\xi(k)$ must be whitened by passing through the transfer function $(1-z^{-1})^{-1}$ as shown in FIG. 2(b) where $\hat{\beta}_{UB}$ denotes an unbiased estimate of $\beta$. The least squares algorithm is, in general, nonlinear and time-varying. However, if it is assumed that the algorithm in Equation (11) asymptotically approaches a time-invariant system, then under such an assumption, one may interchange the least squares algorithm with the transfer function $(1-z^{-1})^{-1}$ to arrive at the arrangement of FIG. 2(c). This, of course, corresponds to post-averaging the least squares estimates, which is the preferred technique for the present invention. Such a simple procedure provides very significant improvement in the estimates $\hat{\beta}(k)$ when the signal-to-noise ratio is low. In the simulations of the next section, the infinite time average $(1-z^{-1})^{-1}$ of FIG. 2(c) is replaced by an exponentially data-weighted averaging to take into account the time variation of the parameters to be estimated.

3(b). DLS Algorithm in the Data Modulation Case

In this case, the data samples $D(k)$ in the signal model of Equation (4) take only possible values $\pm 1$ and the received signal may equivalently be written as:

$$y(k) = D(k) A \sin(\theta(k)) + v_i(k)$$

$$z(k) = D(k) A \cos(\theta(k)) + v_q(k); \ k=1, 2, \ldots, N \quad (15)$$

Thus, as may be easily verified over any bit interval $T_b$, where $D(k)$ remains constant, the differential signal model of Equation (6) remains valid irrespective of the value of $D(k)$. The model of Equation (6), however, is not applicable for those samples which lie on the bit boundaries, i.e., when y(k) and y(k−1) lie in different bit intervals. A simple modification of the algorithm to take care of the data modulation case is to simply discard such differential samples. If the number of samples M over any bit period is fairly large, this would incur a negligible loss in the effective signal-to-noise ratio compared to the case of no data modulation. In fact, such a loss is simply equal to $10 \log_{10}(1-1/M)$ dB which is 0.45 dB for M=10. This is corroborated by the simulations of the next section.

3(c) Estimation of Time-Varying Parameters

In the signal model considered above, it is assumed that the input signal parameter vector $\psi_{IO}$ is either a constant or a slowly varying function of time. In practice, this may be the case only over relatively short intervals of time, but there may be large variations in $\psi_{IO}$ over a comparatively large observation period. To take into account such a variation and to ensure that the instantaneous difference frequency $\Omega(t) \triangleq d/dt(\theta(t))$ (the sampled version of $\theta(t)$ given in Equation (4)) remains within the low-pass filter-pass band of FIG. 1, the parameter vector $\psi_{Lo}$ generating the instantaneous frequency of the VCO is updated at regular intervals of $T=NT_s$ sec for some integer N. The parameter vectors $\psi_I, \psi_{Lo}$ and $\psi_o$ would change their values at intervals of T sec, assuming that the value of N is selected to be sufficiently small so that the variation in $\psi_I$ over any T sec interval is small. Denoting by $\theta_{Lo}(T+), \omega_{Lo}(T+)$, etc., the values of reference oscillator parameters just after the update at time T, are:

$$\theta_{Lo}(T+) = \theta_{Lo}(T-)$$

$$\omega_{Lo}(T+) = \Omega_{Lo}(T-) \hat{\omega}_o(0/T) + 2T\hat{\gamma}_o(0/T) + 3T^2 \hat{\delta}_o(0/T)$$

$$\gamma_{Lo}(T+) = \Gamma_{Lo}(T-) + 3T\hat{\delta}_o(0/T)$$

$$\delta_{Lo}(T+) = \Delta_{Lo}(T-) + \hat{\delta}_o(0/T) \quad (16)$$

In Equation (16), $\theta_{Lo}(T-), \Omega_{Lo}(T-)$, etc., represent the oscillator instantaneous phase, frequency, etc., just before the correction, and the remaining terms on the right hand side represent the correction made on the basis of the estimation algorithm. Thus, $$\theta_{Lo}(T-) = \theta_{Lo}(0+) + \omega_{Lo}(0+)T + \gamma_{Lo}(0+)T^2 + \delta_{Lo}(0+)T^3$$

$$\Omega_{Lo}(T-) = \omega_{Lo}(0+) + 2\gamma_{Lo}(0+)T + 3\delta_{Lo}(0+)T^2$$

$$\Gamma(T-) = \gamma_{Lo}(0+) + 3T\delta_{Lo}(0+)$$

$$\Delta_{Lo}(T-) = \delta_{Lo}(0+) \quad (17)$$

Note that in Equation (16) there is no correction in the oscillator phase as the DLS algorithm does not provide the phase estimate. In Equation (16) $\hat{\omega}_o(0+T)$ denotes the estimate of parameter $\hat{\omega}_o(0+)$ obtained on the basis of measurements up to time T. Since there is no step change in the oscillator phase, the sampled measurements y(N) and z(N) at the demodulator output are the same with or without a correction at the instance $NT_s$. However, the subsequent measurements y(N+j) and z(N+j) are now expressed with respect to the new parameter vector $\omega_o(T+) = [\theta_o(T+) \; \omega_o(T+) \; \delta_o(T+)]' = \psi_{Io}(T+) - \psi_{Lo}(T+)$ as in Equation (18) below.

$$y(N+j) = A \sin(\theta(N+J)) + v_i(N+j)$$

$$z(N+j) = A \cos(\theta(N+J)) + v_q(N+j); \; j=1,\ldots,N$$

$$\theta(N+j) = \theta_o(T+0) + \omega_o(T+)jT_s + \gamma_o(T+)(jT_s)^2 + \delta_o(T+)(jT_s)^2 \quad (18)$$

The last three elements of the vector $\psi_o(T+)$ will be zero if there is no change in the input signal parameters over the T sec interval and the estimate of $\psi_o(0+)$ is obtained with zero estimation error. Thus, the technique is to set the a-priori estimate of the vector $\psi_o(T+)$ equal to 0 and apply the DLS algorithm to estimate $\psi_o(T+)$ on the basis of observations $\{y(N+j), z(N+j); j=1,\ldots, N\}$. The measurement model is obtained by simply replacing the index k by k+N in $y(k), z(k), \xi_i(k), \xi_q(k)$ in Equations (6-9) but with $\tau_k = (k-\frac{1}{2})T_s$ as before (corresponding to a shift in time reference).

In the estimation of $\psi_o(T+)$ via the recursive algorithm of Equation (11) with the index $k=N+1,\ldots 2N$, the "initial" covariance matrix P(N+1) is obtained as:

$$P(N+1) = \lambda F P(N) F' + Q \quad (19)$$

where $$F \triangleq \begin{bmatrix} 1 & 2T & 3T^2 \\ 0 & 1 & 3T \\ 0 & 1 & 1 \end{bmatrix}$$

and the matrix Q represents the uncertainty introduced due to the change in the input process parameters over the interval of T sec. Specifically, the last diagonal element of Q represents the variance of the change in the parameter 6δ (equal to the second derivative of frequency and related to the jerk of the physical trajectory) over the interval T. The above procedure is then extended in a straightforward manner to the subsequent update intervals. The estimates of the input signal phase and frequency at time instances lT+ are then simply given by $\theta_{Lo}(lT+)$ and $\omega_{Lo}(lT+)$ respectively for $l=0, 1, 2, \ldots$.

4. Multistage Estimation

Most of the phase and frequency estimation schemes for the first stage of a multistage estimate can be represented as in FIG. 3(a) in which elements common with FIG. 1 are identified by the same reference numerals. An update algorithm (represented by a functional block 21) for generating the correction signal for the VCO could be any recursive or semi-recursive algorithm including an EKF or DLS algorithm, and the VCO update interval may be some integer multiple of the sampling period $T_s$. FIG. 3(b) illustrates a functional block model for the generalized first-stage estimator illustrated in FIG. 3(a). This functional block model will be used hereinafter as a symbol to illustrate the first stage in a multistage estimator shown in FIG. 4 in accordance with the objective of this invention. Note that $\hat{\theta}(t), v_i(t)$ and $v_q(t)$ of FIG. 3(a) are respectively equal to $\theta^1(t), v_i^1(t), v_q^1(t)$ of FIG. 3(b). FIG. 3(c) illustrates a functional block model for subsequent stages of the multistage estimator of FIG. 4.

An important observation made from FIG. 3(b) is that along with the estimate $\hat{\theta}_I(t)$ of the input phase process $\theta_I(t)$, there is also available a pair of signals, $y^1(t) = A \sin \theta 41(t) + v_i^1(t), z^1(t) = A \cos \theta(t) + v_q^1(t)$ dependent upon the estimation error $\theta(t) = \theta_I(t) - \theta_L(t)$. These error signals have exactly the same form as the signals at the input to the estimator. Moreover, the additive noise associated with these signals has statistics identical with the statistics of the noise at the input to the estimator. Therefore, this leads to the interesting possibility of the present invention, namely estimating the error signals $\hat{\theta}(t)$ in a way similar to the estimation of $\theta_f(t)$. In fact, the procedure can be repeated any number of times as shown in FIG. 4, although only a two-stage estimator is described below as an example of the present invention. It should also be noted that only the first estimation stage shown in FIG. 3(a) requires a VCO for down conversion because the actual input to this stage is at rf frequency $\omega_c$, whereas subsequent estimator stages generate the error signals by simple baseband computations. For example, in the discrete-time version of the estimation procedure, the signal at the output of estimation stage m may simply be computed as $$y^m(k) = y^{m-1}(k) \cos(\hat{\theta}^{m-1}(k-1)) - z^{m-1}(k) \sin(\hat{\theta}^{m-1}(k-1))$$

$$z^m(k) = y^{m-1}(k) \sin(\hat{\theta}^{m-1}(k-1)) + z^{m-1}(k) \cos(\hat{\theta}^{m-1}(k-1)); m = 2, 3, \ldots n \quad (20)$$

The refined estimate of the phase process $\theta_f(t)$ in FIG. 4 at sampling instance k is then simply given by $$\hat{\theta}_f(k) = \theta_L(k) + \hat{\theta}^1(k) + \ldots + \hat{\theta}^n(k) \quad (21)$$

The advantage of such a recursive estimation procedure is that the overall threshold in terms of the required CNR for the multistage estimator can be made much smaller than a single stage estimator, especially in situations involving high dynamics.

In the prior-art single-stage estimator shown in FIG. 1, the process parameters may be assumed to remain constant only over short intervals of time due to the high dynamics involved in a receiver carried, for example, in a high performance aircraft or spacecraft. Thus, the estimator is forced to use a relatively large noise bandwidth (shorter averaging period), resulting in large errors in the phase and/or frequency estimates. If the estimation errors are outside the region over which the error model (linear) assumed for the estimator remains valid, the estimator is said to be working below threshold or in the out-of-lock condition. In this condition, the estimation errors can be several orders of magnitude higher compared to the operation above threshold.

In the multistage estimator of the present invention, this difficulty can be circumvented by successive reduction of the dynamics (the estimation errors due to dynamics) at the output of consecutive estimator stage and by averaging the signal over progressively longer intervals (and thus progressively reducing the effect of noise) over which the process parameters remain nearly constant. In this multistage estimation structure, none of the individual stages (except the last one) need necessarily operate above its threshold. For the convergence of the overall estimator, one only requires that the estimates are made in the right direction (estimation errors do not exceed the parameters to be estimated in some average sense).

5. Recursive DLS-EKF Algorithm

The following section considers a simple special case of n = 2 for the more general multistage estimator of FIG. 4, wherein the first stage is as described above with reference to FIGS. 3a and 3b and the DLS algorithm is as described in the previous section above. The second stage is an extended Kalman filter (EKF) as described above with reference to FIG. 3c. As the dynamic variation of the error signal $\hat{\theta}(k) = \theta^1(k)$ of the first stage is much smaller compared to the original signal $\theta(k)$ (the frequency variation over any update interval is much smaller), the effective averaging time period for the second-stage estimator implemented with a Kalman filter can be selected to be higher than for the first stage implemented with a DLS algorithm. This is achieved by selecting a smaller value of the "dynamic noise" covariance matrix Q for the EKF and/or a higher value for the exponential data weighting coefficient $\lambda$ of Equation (9).

5a. Extended Kalman Filter (EKF) Algorithm

Referring to FIG. 4, consider the problem of estimating the unknown error signal parameters $\omega_{ol}$, $\gamma_{ol}$ and $\delta_{ol}$ in the lth VCO update period for any integer $l \geq 1$ on the basis of the set of measurements $\{y^1(k), z^1(k)\}$ of Equation (22) below by an EKF $$y^1(k) = A \sin(\theta^1(k)) + v_i^1(k)$$

$$z^1(k) = A \cos(\theta^1(k)) + v_q^1(k)$$

$$\theta^1(k) = \theta_{ol} + \omega_{ol}(jT_s)^2 + \delta_{ol}(jT_s)^3$$

$$k = N(l-1) + j; j = 1, 2, \ldots, N; l = 1, 2, \ldots \quad (22)$$

Note that as for the first-stage DLS algorithm the parameter vector $\psi_{ol} = [\theta_{ol} \omega_{ol} \gamma_{ol} \delta_{ol}]'$ may be different over different VCO update intervals. For computational simplicity, a third-order EKF is used in the second stage and the contribution of the last term in the expression for $\theta^1(k)$ is ignored, which is appropriate for the GPS trajectories considered here. Denoting the state and parameter vectors at time $k = N(l-1) + j$ by $\psi(j)$ and $\eta_l$ respectively, with $\psi(j) = [1 \; jT_s \; 0.5(jT_s)^2]'$, $\eta_l = [\theta_{ol} \omega_{ol} 2\lambda_{ol}]'$, the extended Kalman filter equations for the update of $\eta_l$ in the second stage, the estimate of $\eta_l$, are given by $$\hat{\eta}_l = \hat{\eta}_l(j-1) + K(j)v(j) \quad (23)$$

$$K(j) = \Sigma(j-1)\psi(j)(\lambda + \psi'(j)\Sigma(j-1)\psi(j))^{-1}$$

$$\Sigma(j) = \{\Sigma(j-1) - \Sigma(j-1)\psi(j)[\lambda + \psi'(j)\Sigma(j-1)\psi(j)]^{-1}\psi'(j)\Sigma(j-1)\}/\lambda$$

$$v(j) = y^1(k)\cos(\hat{\phi}(j)) - z^1(k)\sin(\hat{\phi}(j))$$

$$\hat{\phi}(j) = \psi'(j)\hat{\eta}_l(j-1); k = (l-1)N + j;$$

$$j = 1, 2, \ldots, N; l = 1, 2, \ldots$$

In the Equation (23) above, the initial estimate $\eta_l(0)$ is simply taken to be equal to $\hat{\eta}_{l-1}(N)$. This is an appropriate choice for the initial estimate in view of the fact that if the first stage of the DLS estimation algorithm is convergent then $\eta_l$ would possess some continuous drift term, i.e., $\omega_{ol}$ will have a component linear in time if $\downarrow_{ol} \neq 0$. The "initial error covariance" matrix $\Sigma_l(0)$ is simply set equal to some diagonal matrix representing the uncertainty in the difference parameter $\eta_l$-$\eta_{l-1}$.

5b. Estimation in the Presence of Data Modulation

In this case one could apply the ore sophisticated version of R. Kumar (1988) cited above, wherein an explicit detection of possible data transitions is followed by the demodulation of data, thus effectively reducing the problem to the case of no data modulation considered above. However, here such a detection is bypassed, and instead a simple modification in the estimation algorithm is proposed that takes into account the data modulation. If the VCO update interval T is selected equal to bit period $T_b$, then the data modulation represents an additional phase uncertainty at the boundaries of the update intervals. This is taken into account by adding an appropriate value, say $(\pi/2)^2$, to the first diagonal element of $\Sigma_l(0)$ and modifying the initial estimator $\eta_l(0)$ by $\pi/2$, i.e., $\eta_l(0) = \eta_{l-1}(N) + \pi/2$, for those values of l that correspond to bit boundaries. Such an algorithm is expected to result in somewhat higher estimation errors compared to the more sophisticated scheme of R. Kumar (1988) cited above, but is much simpler in terms of implementation. In the case of a two-stage estimator (stages 1 and 2 of FIG. 4), the estimates of the input signal phase and frequency at time instance lT are given by $$\hat{\theta}(lT) = \theta_L((l-1)T+) + \psi'(N)\hat{\eta}_l(N)$$

$$\hat{\Omega}(lT) = \Omega_L((l-1)T+) + \hat{\omega}_{ol} + 2\hat{\gamma}_{ol}(NT_s) \qquad (24)$$

where $\hat{\omega}_{ol}$ and $\hat{\gamma}_{ol}$ represent the second and third element respectively of $\hat{\eta}_l(N)$.

6. Simulations

Simulation results obtained when the algorithm is applied to the tracking of phase and frequency for high dynamic GPS receivers will now be presented. For the purpose of simulation, assume that the pseudo-random code has been removed from the received signal, and symbol timing has been acquired. The simulation considers both the case of the data modulation removed via an auxiliary link and the case of an unknown modulation present. For the simulations a sampling rate of 500 samples/second is assumed with a high dynamic trajectory considered previously in V. A. Vilnrotter, et al., "A Comparison of Frequency Estimation Techniques for High Dynamic Trajectories," JPL 88-21, Jet Propulsion Laboratory, California Institute of Technology, Pasadena, Calif., September 1988, and reproduced in FIG. 5 where the acceleration and the jerk (the derivative of acceleration) are measured in units of g (the gravitational constant equal to 9.8 m/s). In the case when data modulation is present, a BPSK modulation at a rate of 50 bits/second is assumed.

The parameters of most interest in this application are the instantaneous phase and frequency of the input signal $r_i(t)$, which corresponds to the high dynamic GPS trajectory of FIG. 5. Since the present invention is mainly interested in the tracking performance of the proposed algorithm, it is assumed that the initial trajectory parameters at zero time are known as in V. Vilnrotter, et al., Sept. 1988, supra. The received signal carrier frequency $f_d = \omega_c/2\pi$ in the signal model of Equation (1) is taken to be equal to 1.575 GHz. The GPS receiver instantaneous pseudo-rand R in meters and velocity $v_d$ in m/s are related to the instantaneous phase $\theta_i(t)$ of Equation (1) and its derivative $\dot{\theta}_i(t)$ as $$R = \frac{\theta}{2\pi} \frac{c}{f_c} \qquad 25$$

$$v_d = f_d \frac{c}{f_c} = \frac{\dot{\theta}}{2\pi} \frac{c}{f_c}$$

where $f_d$ denotes the Doppler in Hz and c is the speed of light. Denoting by $\hat{R}(l)$ and $\hat{f}_d(l)$ the estimates for R(l) and $f_d(l)$ respectively, which denote the range and Doppler of the input trajectory at the end of the lth update interval, then the performance measures of the estimation algorithm are given by the following sample rms values of the estimation errors $$\bar{R}_{rms} \overset{\Delta}{=} \frac{1}{L} \sqrt{\sum_{l=1}^{L} [\hat{R}(l) - R(l)]^2} \qquad (26)$$

$$\bar{f}_{d,rms} \overset{\Delta}{=} \frac{1}{L} \sqrt{\sum_{l=1}^{L} [\hat{f}_d(l) - f_d(l)]^2}$$

where L=4000/N is the number of update intervals for the entire trajectory. These measures are obtained as a function of $P/N_o$, where P denotes the received carrier power and $N_o$ is the one-sided power spectral density of the receiver bandpass noise.

At lower range of $(P/N_o)$ ratio, the receiver may lose frequency lock in that the frequency errors at times may exceed ±one-half of the sampling frequency, $f_s$ or ±250 Hz. Since the error signals $\epsilon(k)$ of Equation (11) are the same for frequency errors of $\Delta$ Hz as for the case of $\Delta + nf_s$ Hz for any signed integer n, the estimator may make frequency estimation errors of $nf_s$ Hz. This situation may be referred to as cycle slipping in the frequency estimator and is akin to the phenomenon of cycle slipping (phase errors equal to multiples of $2\pi$) in the phase-estimators. If there are one or more cycles slipped in frequency, the computed value of $\bar{f}_{d,rms}$ would be much larger compared to the case when no such cycle slips occur and would be unacceptable. Thus, another important parameter for the performance is the probability of maintaining frequency lock throughout the trajectory denoted P(lock) or the probability of losing the lock $P_L = 1 - P(lock)$. For the purposes of estimating the probability by digital computer simulations, 100 simulation runs are made for each value of $P/N_o$ of interest and an estimate of $P_L$ is plotted vs the carrier power to noise power spectral density ratio (CNR). The sample rms values of Equation (26) are also averaged over all those simulation runs for which the frequency lock is maintained. It may well be that for sequences that remain under frequency lock there may be slipping of cycles in the phase estimates. However, even under the presence of such cycle slips, the computation made on the basis of Equation (25) provides a good estimate of the pseudo-range as evidenced by the simulations. One cycle slip only corresponds to an error of about 0.2 meters in the pseudo-range estimate.

FIGS. 6–15 present the simulation results for the DLS algorithm and the composite DLS-EKF algorithms presented in the previous sections. The results for the EKF algorithm operating by itself are available in V. Vilnrotter, et al., Sept. 1998, supra, for comparison. For the simulation results a value of $\lambda$ equal to 0.97 has been selected. The initial covariance matrix P(0) for the DLS algorithm is selected to be a diagonal matrix with its diagonal elements equal to $2 \times 10^3$, $2 \times 10^7$ and $2 \times 10^9$ respectively, reflecting the possible uncertainty about the parameters. Three different VCO update intervals equal to 5, 10 and 20 sample times have been considered. The matrix Q of Equation (19) is also selected to be a diagonal matrix for convenience, with its consecutive diagonal elements equal to $4 \times 10^3$, $2 \times 10^6$ and $10^8$. The Q matrix represents possible variations in the input signal parameters over an update interval and is arrived at from the consideration of a-priori estimate of the maximum possible value of the highest order derivative (jerk) present in the input trajectory. For the second stage EKF algorithm, the initial covariance matrix $\Sigma_f(0)$ is selected to be also a diagonal matrix but with its elements smaller in value than the corresponding elements of the Q matrix, thus effectively resulting in a higher averaging period and smaller estimation errors compared to the DLS algorithm. The selected values of diagonal elements of $\Sigma_f(0)$ matrix are equal to 1.0, $10^3$ and $10^6$ respectively, in the following simulations. From the simulations it appeared to be advantageous in terms of numerical stability to periodically reset the covariance matrix P of the DLS algorithm to its initial value. Such a period was selected to be 10 times the VCO update interval.

FIGS. 6 and 7 present the simulation results for the performance of DLS algorithm while tracking the high dynamic trajectory of FIG. 5 in the absence of any data modulation. FIG. 6 plots the probability of losing the frequency lock $P_L$ as a function of CNR for two different values of N equal to 10 and 20. As may be inferred from the figure, a value of $P_L$ of less than 0.1 is obtained for CNRs above 23.1 dB which is defined to be the threshold point of the algorithm. FIG. 6 also plots the average number of cycles slipped in the frequency estimation, denoted by $\overline{N}_{cs}$. In defining such a cycle slip, the entire frequency range is divided into disjoint segments of $f_s$ Hz with the first segment extending from $-f_s/2$ to $f_s/2$ Hz. Whenever the frequency estimation error jumps from one such segment to an adjacent one in either direction, a cycle slip is said to occur. FIG. 7 plots the rms error in the Doppler estimation as computed from Equation (26) and averaged over all convergent sequences. For a CNR between 25 and 30 dB-Hz, an rms error of 10-20 Hz is obtained that corresponds to a velocity tracking error of 2-4 m/s. FIG. 7 also plots the averaged length $\overline{L}_{cs}$ of a slipped cycle in terms of number of samples. The information about $\overline{N}_{cs}$ and $\overline{L}_{cs}$ is relevant in the case of multistage algorithm. FIGS. 8 and 9 present the results for the probability of losing lock $P_L$ and the rms estimation error for the DLS algorithm in the presence of data modulation for three different values of N equal to 5, 10 and 20. As may be observed from the figures, the presence of data modulation increases the threshold by only 0.25-0.5 dB compared to the case of no data modulation. The increase in rms frequency estimation error is about 10% due to data modulation.

FIGS. 10 and 11 present the performance of the composite DLS-EKF algorithm in the absence of data modulation. Note that corresponding to N=5, the threshold of the algorithm is 22.75 dB-Hz, which is slightly smaller than for the DLS algorithm. However, the rms estimation errors are significantly smaller than for the single-stage DLS algorithm. For the CNR range of 25-30 dB-Hz, the rms error in the Doppler estimation lies in the range of 4-15 Hz corresponding to the velocity estimation error range of 0.8 to 3 m/s. The DLS-EKF algorithm also provides the carrier phase estimate. The modulo-$2\pi$ phase-estimation error is plotted in FIG. 12 from which it is clear that the algorithm is capable of coherent data detection with small probability of error if the CNR is higher than 25 dB-Hz. In fact, as shown in FIG. 15, the algorithm provides good estimates of pseudo-range (related to the absolute phase error via Equation (25)) up to a CNR of about 23 dB at which point the rms error is less than 4 m. The rms pseudo range error is less than 1 m for CNRs higher than 25.5 dB-Hz.

The corresponding results for the performance of DLS-EKF algorithm in the presence of data modulation are presented in FIGS. 13-15. For this case, a minimum threshold of 23.8 dB is obtained for N=10 which is about 1 dB higher than for the case of no data modulation. In terms of rms estimation errors, for a CNR range of about 25-30 dB-Hz, the rms frequency estimation error lies in a range of 8-20 Hz corresponding to a velocity error of about 1.5 to 4 m/s. For this case, as is apparent from FIG. 15, the pseudo-range estimation errors are also higher and for a CNR range of 25-30 dB-Hz lie in a range of 0.3-6 m. Notice, however, that no sharp threshold is observed in either the frequency or phase estimation errors over the entire range of CNR between 22-30 dB-Hz considered in the simulations.

7. Comparison with Previous Techniques

For the case of no data modulation, the following compares the performance of the proposed algorithm with some of the techniques analyzed in V. Vilnrotter, et al., (1988) cited above, in terms of their performance when tracking exactly the same high dynamic trajectory. Compared to a more computation-intensive maximum likelihood estimate, the DLS-EKF algorithm requires about 0.25 dB smaller CNR than MLE in terms of threshold. In terms of rms frequency estimation errors, the MLE achieves an rms error between 8 Hz to 35 Hz at a CNR of 23 dB-Hz depending upon the estimation delay ranging between 30-80 samples (higher delay provides smaller error). The DLS-EKF algorithm provides an error of 35 Hz for a delay of 5 samples at a CNR of 23 dB-Hz. The MLE algorithm does not provide any phase estimate.

Compared to a single-stage EKF algorithm, the DLS-EKF algorithm is bout 1.5-2.0 dB better in terms of threshold depending upon the value of exponential data weighting coefficient and the filter order used in the simulation of V. Vilnrotter, et al., (1988) cited above. In terms of rms errors, the performance is similar to that of third-order EKF alone. Notice, however, that direct comparison with the results of V. Vilnrotter, et al., may be somewhat misleading. This is so because while the DLS-EKF algorithm includes all of the sequences in the computation of rms error above 25.5 dB-Hz, EKF rejects about 5% of the worst sequences, as the probability of locking lock is about 0.05 at CNR of 25.5 dB-Hz.

For the case of cross product AFC loop analyzed by V. Vilnrotter, et al., the threshold lies in a range of 25-28 dB-Hz depending upon the loop parameters. Thus, the DLS-EKF algorithm is superior by 2-5 dB-Hz compared to AFC loop. AFC loop provides a minimum rms frequency error of 25 Hz at a CNR of 28 dB-Hz compared to a minimum of 5 Hz achieved for the DLS-EKF algorithm for the same CNR. Notice that in an AFC loop, the parameters achieving a relatively low estimation error are different than those yielding low thresholds and thus, a range of loop parameters must be considered for proper comparison. In terms of rms phase error, the performance of the DLS-EKF algorithm is similar to EKF alone. In terms of computations, the DLS-EKF algorithm requires about the same number of computations as for a fourth-order EKF by about twice as many computations as a third-order EKF. The number of computations are at least an order of magnitude smaller than the MLE.

For the case when the data modulation is present, the following compares the performance of the DLS-EKF algorithm with the MLE algorithm of W. J. Hurd, et al., (1987) cited above, where a somewhat less severe GPS trajectory is analyzed. The results of W. J. Hurd, et al., show a marked threshold of about 30 dB-Hz in terms of CNR compared to less than 24 dB-Hz for the proposed algorithm. Thus, the proposed algorithm results in more than 6-dB reduction in terms of threshold compared to previous schemes of the literature.

In terms of the rms frequency estimation errors at a 30 dB-Hz CNR, the MLE algorithm provides an rms range rate error of 6 m/s compared to an error of less than 2 m/s achieved by DLS-EKF algorithm. There is also very significant improvement in terms of the rms position estimation error. At 30 dB-Hz an rms error of 1 meter is reported by W. S. Hurd, et al., compared to about 0.25 meter obtained by the DLS-EKF algorithm. In terms of computations, both of the algorithms are comparable. In terms of threshold on CNR, the DLS algorithm is very close to the composite DLS-EKF algorithm. However, in terms of rms frequency estimation errors, it has significantly higher estimation errors. In those cases where higher estimation errors are acceptable, one may apply the DLS algorithm by itself, as it requires only one-half of the computations required by the DLS-EKF algorithm.

8. Conclusions

A novel multistage estimation scheme has been presented for the efficient estimation of the phase and frequency of a very high dynamic signal, which may possibly by phase modulated by unknown binary data and is received under relatively low carrier-to-noise power ratio conditions. The proposed scheme is of very general nature and has much wider scope than the application described as examples. For a very important application of dynamic GPS trajectories, the specific example of a DLS-EKF scheme described has been specialized to have just two stages. The first stage of the estimation scheme is a least-squares algorithm operating upon the differential signal model while the second stage is an extended Kalman filter of third order.

For very high dynamic GPS trajectories, the proposed algorithm has been shown to significantly outperform the previous algorithms reported in the literature in one or more aspects, including threshold on CNR, estimation errors, availability of phase estimates and thus the estimate of pseudo-range, computational complexity and flexibility. For the case of no data modulation, the proposed scheme has a threshold that is slightly lower than the more computation-intensive implementation of MLE algorithm. When compared to just the EKF operating by itself, the proposed DLS-EKF scheme provides from about 1.5 to 2-dB reduction in threshold. In comparison to more conventional schemes, such as AFC loops, the performance is even better.

For the case when an unknown data modulation is present, the algorithm provides an improvement of 6 dB in terms of threshold on CNR in comparison to the MLE scheme of W. J. Hurd, et al., (1987) specifically proposed for such applications. In addition to phase and frequency estimates, the algorithm can provide estimates of frequency derivative as well, although not presented here. The scheme being of a very general nature, it may be possible to reduce the threshold even further by using a higher dimension for the state vector related to the higher number of terms in the Taylor series expansion in arriving at the signal model for the first stage DLS algorithm. Further improvements are possible by the application of more optimum sampling techniques as proposed by R. Kumar, in "Differential Sampling for Fast Frequency Acquisition via Adaptive Extended Least Squares Algorithm," (1987) cited above. The performance may also be improved both in terms of the threshold and the rms estimation errors by increasing the number of states to three or more.

I claim:

1. A multistage estimator for the parameters of a received carrier signal experiencing at least Doppler and Doppler rate due to high dynamics in relative motion between a receiver and a transmitter of said signal, said signal being phase modulated at times by unknown data, and where the parameters of interest include phase, frequency and frequency derivatives, comprising a plurality of estimation stages connected in cascade for successively reducing estimation errors due to said dynamics, the first of said stages comprising means for estimating parameters of relatively high dynamic signals with relatively high estimation errors as compared to succeeding stages, each succeeding stage comprising means for yielding smaller estimation errors of parameters of lower dynamic signals, successive ones of said estimation stages averaging the received carrier signal over progressively longer intervals during which parameters of the estimation process remain nearly constant, thereby progressively reducing the effects of noise.

2. A multistage estimator as defined in claim 1 wherein said first of said plurality of estimation stages connected in cascade is implemented with a differential least squares algorithm and the second stage is implemented with an extended Kalman filter, whereby a recursive differential least square and extended Kalman filter algorithm is provided for estimation of said parameters of said received signal.

3. A multistage estimator for the parameters of a received carrier signal experiencing at least Doppler and Doppler rate due to high dynamics in relative motion between a receiver and a transmitter of said signal, said signal being phase modulated at times by unknown data, where the parameters of interest include phase, frequency and frequency derivatives, said estimator having a plurality of estimation stages connected in cascade for successively reducing estimation errors due to said dynamics, a first one of said stages in cascade comprising means for using a differential least square algorithm for coarse estimation of parameters related to frequency of said received signal and its derivatives, but with a relatively small probability of the frequency estimation error exceeding one-half the sampling frequency, and a second one of said stages in cascade comprising filter means for operating on the error signal available from said first stage to refine the overall estimates of the phase along with a more refined estimate of frequency, and in the process reducing the number of cycle slips.

4. A multistage estimator for parameters of a received carrier signal under high dynamic conditions of the receiver said estimator having a first stage comprising means for coarse estimation of received signal parameters resulting in higher rms estimation errors but with a relatively small probability of the frequency estimation error exceeding one half of the sampling frequency, and at least a second stage comprising means for operating on the error signals available from said first stage for refining the overall estimates of said parameters.

5. A multistage estimator as defined in claim 4 wherein said means of said first stage is preferably selected to use a differential least squares algorithm for providing relatively coarse estimates of the received signal frequency and its derivatives, and said means of said second stage is preferably selected to be a third-order extended Kalman filter which yields a more refined estimate of frequency as well as an estimate of the signal phase.

* * * * *